United States Patent
Aweya

(10) Patent No.: US 9,178,637 B2
(45) Date of Patent: Nov. 3, 2015

(54) METHOD AND DEVICES FOR SYNCHRONIZATION USING LINEAR PROGRAMMING

(71) Applicants: Khalifa University of Science, Technology, and Research, Abu Dhabi (AE); British Telecommunications plc, London (GB); Emirates Telecommunications Corporation, Abu Dhabi (AE)

(72) Inventor: James Aweya, Abu Dhabi (AE)

(73) Assignees: Khalifa University of Science, Technology, and Research, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 205 days.

(21) Appl. No.: 14/100,345

(22) Filed: Dec. 9, 2013

(65) Prior Publication Data

US 2015/0163000 A1    Jun. 11, 2015

(51) Int. Cl.
*H04J 3/06* (2006.01)
*H04L 7/033* (2006.01)

(52) U.S. Cl.
CPC ............... *H04J 3/0602* (2013.01); *H04L 7/033* (2013.01)

(58) Field of Classification Search
CPC ..... H04J 3/0682; H04J 3/0658; H04J 3/0661; H04J 3/0667; H04W 56/004; H04W 56/0045
See application file for complete search history.

(56) References Cited

U.S. PATENT DOCUMENTS

| | | | |
|---|---|---|---|
| 6,661,810 B1 | 12/2003 | Skelly et al. | |
| 6,957,357 B2 | 10/2005 | Liu et al. | |
| 7,688,865 B2 | 3/2010 | Carlson et al. | |
| 2013/0170507 A1* | 7/2013 | Hsueh et al. | 370/503 |
| 2013/0282875 A1 | 10/2013 | Aweya et al. | |

OTHER PUBLICATIONS

S. B. Moon, P. Skelly and D. Towsley, "Estimation and removal of clock skew from network delay measurements," in Proc. IEEE INFOCOM, vol. 1, pp. 227-234, New York, NY, USA, Mar. 1999.
L. Zhang, Z. Liu and C. H. Xia, "Clock synchronization algorithms for network measurements," in Proc. IEEE INFOCOM, vol. 1, pp. 160-169, Nov. 2002.
A. Bletsas, "Evaluation of Kalman Filtering for Network Time Keeping" IEEE Transactions on Ultrasonics, Ferroelectrics, and Frequency Control, vol. 52, No. 9, Sep. 2005, pp. 1452-1460.

(Continued)

*Primary Examiner* — Hassan Phillips
*Assistant Examiner* — Siren Wei
(74) *Attorney, Agent, or Firm* — Calfee Halter & Griswold LLP

(57) ABSTRACT

This invention relates to methods and devices for synchronization using linear programming, especially over packet networks using, for example, the IEEE 1588 Precision Time Protocol (PTP). Timing protocol messages are exposed to artifacts in the network such as packet delay variations (PDV) or packet losses. Embodiments of the invention provide a two-dimensional linear programming technique for estimating clock offset and skew, particularly from two-way exchange of timing messages between a master and a slave device. Some embodiments include a skew and offset adjustable free-running counter for regenerating the master time and frequency at the slave device.

30 Claims, 9 Drawing Sheets

(56) References Cited

OTHER PUBLICATIONS

F. Sivrikaya and B. Yener, "Time Synchronization in Sensor Networks: A Survey" IEEE Network, Jul./Aug. 2004, pp. 45-50.

Y. Wu, Q. Chaudhari, E. Serpedin, "Clock Synchronization of Wireless Sensor Networks: Message exchange mechanisms and statistical signal processing techniques" IEEE Signal Processing Magazin, Jan. 2011, pp. 124-138.

International Search Report dated May 23, 2014, for International Patent Application No. PCT/GB2013/053241.

Written Opinion dated May 23, 2014, for International Patent Application No. PCT/GB2013/053241.

\* cited by examiner $\tau_{skew\_adjusted}(i) = \tau_{LO} + \hat{a}(i).\tau_{LO}, \quad i=1,2,...,n$ $C_{skew\_adjusted}(n) = \sum_{i=1}^{n} \tau_{skew\_adjusted}(i)$ $= n\tau_{LO} + \tau_{LO}\sum_{i=1}^{n} \hat{a}(i)$ $= C(n) + Corr(n)$

METHOD AND DEVICES FOR SYNCHRONIZATION USING LINEAR PROGRAMMING

FIELD OF THE INVENTION

The present invention relates to methods and devices for synchronization using linear programming. It is particularly, but not exclusively, concerned with time synchronization over packet networks using, for example, the IEEE 1588 Precision Time Protocol (PTP).

BACKGROUND OF THE INVENTION

Packet technologies (e.g., Ethernet, IP) are fundamentally asynchronous, optimized for the bursty nature of data traffic, and provide no inherent timing transfer (frequency and time) capabilities. However, packet technologies like Ethernet are quickly replacing existing provider network infrastructures (widely based on time division multiplexing (TDM) technologies like PDH and SDH). This is due to the relatively higher bandwidths and low costs of packet networking devices, as well as to enhancements in Quality of Service (QoS), Operations, Administration and Maintenance (OA&M), congestion management, and resiliency.

One of the important capabilities missing from a total convergence to packet networking (with Ethernet currently being the technology of choice) is the ability to provide timing and synchronization natively within the network. This would provide Ethernet with the capability to transport time-sensitive applications (such as Circuit Emulation Services (CES) over packet) and to distribute precise frequency and time references.

Time and frequency synchronization plays a crucial role in mobile backhaul networks. Cellular base stations derive their carrier radio frequencies from a highly accurate reference clock, usually within 50 parts-per billion (ppb). This reference clock is typically derived from synchronous TDM interfaces or from expensive GPS receivers located at the base station. Without timing information traceable to a highly accurate Primary Reference Clock (PRC), local interference between channel frequencies, as well as mutual interference with neighboring base stations will occur, ultimately causing dropped calls and degrading the overall user experience. Each base station requires an accurate synchronization reference in order to prevent call drops during handoffs. Call handoffs during mobile client roaming also suffer perceptible delays when base station clocks are not sufficiently synchronized.

Mobile networks fall into two categories, Frequency Division Duplexing (FDD), which uses two separated frequency bands to transmit/receive, and Time Division Duplexing (TDD), which transmits and receives on a single frequency band. Time synchronization (in addition to frequency synchronization) is needed for LTE-TDD, WiMAX TDD, CDMA networks (popular in North America), and TD-CDMA and TD-SCDMA, while only frequency synchronization is required for LTE-FDD, GSM (global system for mobile communications), W-CDMA, and other wireless technologies. Even with the use of LTE-FDD, new LTE mobile services such as network MIMO and location-based services will demand accurate time synchronization.

In the case where clock transfers have to be done end-to-end with no assistance from the packet network (in the form of hop-by-hop Boundary Clocks (BCs) or Transparent Clocks (TCs)), there are no reference clocks traceable to a PRC at both ends of the packet network, or in the absence of a network-wide GPS service, a receiving timing-dependent terminal node has to use an adaptive timing technique to reconstruct the timing signal of the transmitting timing reference source. The receiving terminal source would commonly use a "packet-based" clock recovery mechanism that slaves the receiver clock to a transmitter clock. The clock recovery mechanism is able to process transmitted clock samples (timestamps) encoded within the packet data stream to generate timing signal for the receiver. The purpose of the clock recovery mechanism is to estimate and compensate for the frequency drift occurring between the oscillators of the transmitter clock and the receiver clock. However, the presence of packet delay variation (PDV) and packet losses affects the performance of the clock estimation/compensation process, making the transmitter clock appear faster or slower than it actually is, and ultimately, causing the propagation of mostly wander up to the receiver clock signal. (Wander is clock noise less 10 Hz while jitter is clock noise equal or greater than 10 Hz.)

IEEE 1588 PTP Message Flow

The IEEE 1588v2 PTP defines a packet-based synchronization protocol for communicating frequency, phase and time-of-day information from a master to one or more slaves with sub-microsecond accuracy. PTP relies on the use of accurately timestamped packets (at nanosecond level granularity) sent from a master clock to one or more slave clocks to allow them to (frequency or time) synchronize to the master clock. Synchronization information is distributed hierarchically, with a GrandMaster clock at the root of the hierarchy. The GrandMaster provides the time reference for one or more slave devices. These slave devices can, in turn, act as master devices for further hierarchical layers of slave devices.

The PTP message exchange process (i.e., the PTP Delay Request/Delay Response flow) between a master 1 and a slave 3 is performed as follows and illustrated in FIG. 1. IEEE 1588 PTP allows for two different types of timestamping methods, either one-step or two-step. One-step clocks update time information within event messages (Sync and Delay-Req) on-the-fly, while two-step clocks convey the precise timestamps of packets in general messages (Follow_Up and Delay-Resp). A Sync message is transmitted by a master 1 to its slaves 3 and either contains the exact time of its transmission or is followed by a Follow_Up message containing this time. In a two-step ordinary or boundary clock, the Follow_Up message communicates the value of the departure timestamp for a particular Sync message.

FIG. 1 illustrates the basic pattern of synchronization message exchanges for the two-step clocks. The master 1 sends a Sync message to the slave 3 over a network 2 and notes the time $T_1$ at which it was sent. The slave 3 receives the Sync message and notes the time of reception $T_2$. The master 1 conveys to the slave the timestamp $T_1$ by one of two ways: 1) Embedding the timestamp $T_1$ in the Sync message. This requires some sort of hardware processing (i.e., hardware timestamping) for highest accuracy and precision. 2) Embedding the timestamp $T_1$ a Follow_Up message as shown in FIG. 1. Next, the slave 3 sends a Delay_Req message to the master 1 and notes the time $T_3$ at which it was sent. The master receives the Delay_Req message and notes the time of reception $T_4$. The master 1 conveys to the slave 3 the timestamp $T_4$ by embedding it in a Delay_Resp message.

At the end of this PTP messages exchange, the slave 3 possesses all four timestamps $\{T_1, T_2, T_3, T_4\}$. These timestamps may be used to compute the offset of the slave's clock 5 with respect to the master clock 4 and the mean propagation time of messages between the two clocks. The computation of offset and propagation time assumes that the master-to-slave and slave-to-master propagation times are equal—symmetrical communication path. Clock frequencies change over time, so periodic message exchanges are required. Because these clock variations change slowly, the period between message exchanges is typically on the order of milliseconds to seconds.

Time/frequency can be transferred in an end-to-end fashion from master 1 to slave 3 without involving the intermediate network nodes 6 as illustrated in FIG. 2. In this scenario the slave 3 is solely responsible for correctly recovering the master clock signal. Compared to the other methods (e.g., using hop-by-hop Boundary Clocks or Transparent Clocks), time/frequency transfer here is more challenging because the slave 3 is exposed to all the PDV generated by the intermediate packet network 2 (as illustrated in FIG. 3 and FIG. 4). The processing and buffering of packets in network devices (switches, routers, etc.) introduce variations in the time latency of packets traversing the packet network 2 that tend to degrade the clock signal transferred. The PDV inherent in packet networks is a primary source of clock noise. The recovered clock from the PTP timing signal at the slave 3 contains clock noise (contributed largely by PDV) that needs to be removed or attenuated. A filtering process is used at the slave 3 to filter out the clock noise, thus generating a "smooth" clock output.

There are several clock synchronization techniques that estimate clock skew through linear regression, linear programming and convex hull methods. Specifically, [1] describes a number of methods one of which is a linear regression technique. The problem with linear regression algorithms is that they are usually not robust to presence of large outliers and thus only valid and work well for certain PDV models (e.g. Gaussian). A more complicated approach is proposed in [1][2] where a linear programming technique is used to estimate the clock skew in one-way network delay measurements. The technique shows improvement in performance compared to other existing algorithms. In [3][4] skew estimation is achieved through the computation of convex hull generated from one-way delay measurements. The authors claim that convex-hull approach provides better insight and handling of error metrics compared to linear regression or linear programming techniques. An extension of this technique is introduced by [5] where both the offsets and skew are estimated by a lower and upper convex hull approach that relies on using downstream (master to slave) and upstream (slave to master) delay measurements.

When clock synchronization is done in an end-to-end manner over a packet network, the timing protocol messages are exposed to packet network artifacts like packet delay variations (PDVs) and packet losses. The PDV inherent in packet networks is a direct contributor to the noise in the recovered clock at the end system.

An object of the present invention is to recover the master clock accurately at the slave in the face of all the PDV generated by the intermediate packet network.

It is a further object of the present invention to achieve accurate and robust synchronization over IEEE 1588 for critical applications that require stringent synchronization margins.

SUMMARY OF THE INVENTION

An exemplary embodiment of the invention provides a slave device connected to a master device having a master clock over a network, wherein the slave device includes a slave clock, and wherein: the slave device is arranged to: exchange with the master device, timing messages and record timestamps which are: the time of sending of said timing messages from the master device according to the master clock; the time of receipt of said timing messages according to the slave clock; the time of sending of said timing messages according to the slave clock; and the time of receipt of said timing messages according to the master clock; formulate a linear programming problem which seeks to minimize the expression $\theta_f - \theta_r$, in which $\theta_f$ is the offset of the slave clock compared to the master clock, derived from timing messages sent from the master to the slave and $\theta_r$ is the offset derived from timing messages sent from the slave to the master, subject to the constraints that $T_{1,n} \geq (1+\alpha)T_{2,n} + \theta_f$, $T_{4,n} \leq (1+\alpha)T_{3,n} + \theta_r$, and $\theta_f - \theta_r \geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock; solve the linear programming problem to derive an estimate of the skew and offset of the slave clock relative to the master clock; and synchronize the slave clock to the master clock based on the estimated skew and offset to produce a master time estimate.

A further exemplary embodiment of the invention provides a method of synchronizing the time and frequency of a slave clock in a slave device to a master clock in a master device which is connected to the slave device over a network, the method including the steps of: exchanging, between the master device and the slave device, timing messages and timestamps which are: the time of sending of timing messages from the master device according to the master clock; the time of receipt of said timing messages according to the slave clock; the time of sending of said timing messages according to the slave clock; and the time of receipt of said timing messages according to the master clock; formulating a linear programming problem which seeks to minimize the expression $\theta_f - \theta_r$ in which $\theta_f$ is the offset of the slave clock compared to the master clock, derived from timing messages sent from the master to the slave and $\theta_r$ is the offset derived from timing messages sent from the slave to the master, subject to the constraints that $T_{1,n} \geq (1+\alpha)T_{2,n} + \theta_f$, $T_{4,n} \leq (1+\alpha)T_{3,n} + \theta_r$, and $\theta_f - \theta_r \geq 0$ wherein: a is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock; solving the linear programming problem to derive an estimate of the skew and offset of the slave clock relative to the master clock; and synchronizing the slave clock to the master clock based on the estimated skew and offset to produce a master time estimate.

A further exemplary embodiment of the invention provides a time and frequency synchronisation system for a network, the system including: a master device having a master clock; a slave device having a slave clock; and a network connecting the master and slave devices, wherein: the slave clock comprises a slave clock; and the slave device is arranged to: exchange with the master device, timing messages and to record timestamps which are: the time of sending of said timing messages from the master device according to the master clock; the time of receipt of said timing messages according to the slave clock; the time of sending of said timing messages according to the slave clock; and the time of receipt of said timing messages according to the master clock; formulate a linear programming problem which seeks to minimize the expression $\theta_f - \theta_r$ in which $\theta_f$ is the offset of the slave clock compared to the master clock, derived from timing messages sent from the master to the slave and $\theta_r$ is the offset derived from timing messages sent from the slave to the master, subject to the constraints that $T_{1,n} \geq (1+\alpha)T_{2,n} + \theta_f$, $T_{4,n} \leq (1+\alpha)T_{3,n} + \theta_r$ and $\theta_f - \theta_r \geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock; solve the linear programming problem to derive an estimate of the skew and offset of the slave clock relative to the master clock; and synchronize the slave clock to the master clock based on the estimated skew and offset to produce a master time estimate.

BRIEF DESCRIPTION OF THE DRAWINGS

Embodiments of the invention will now be described by way of example with reference to the accompanying drawings in which.

DETAILED DESCRIPTION

Figure 1:
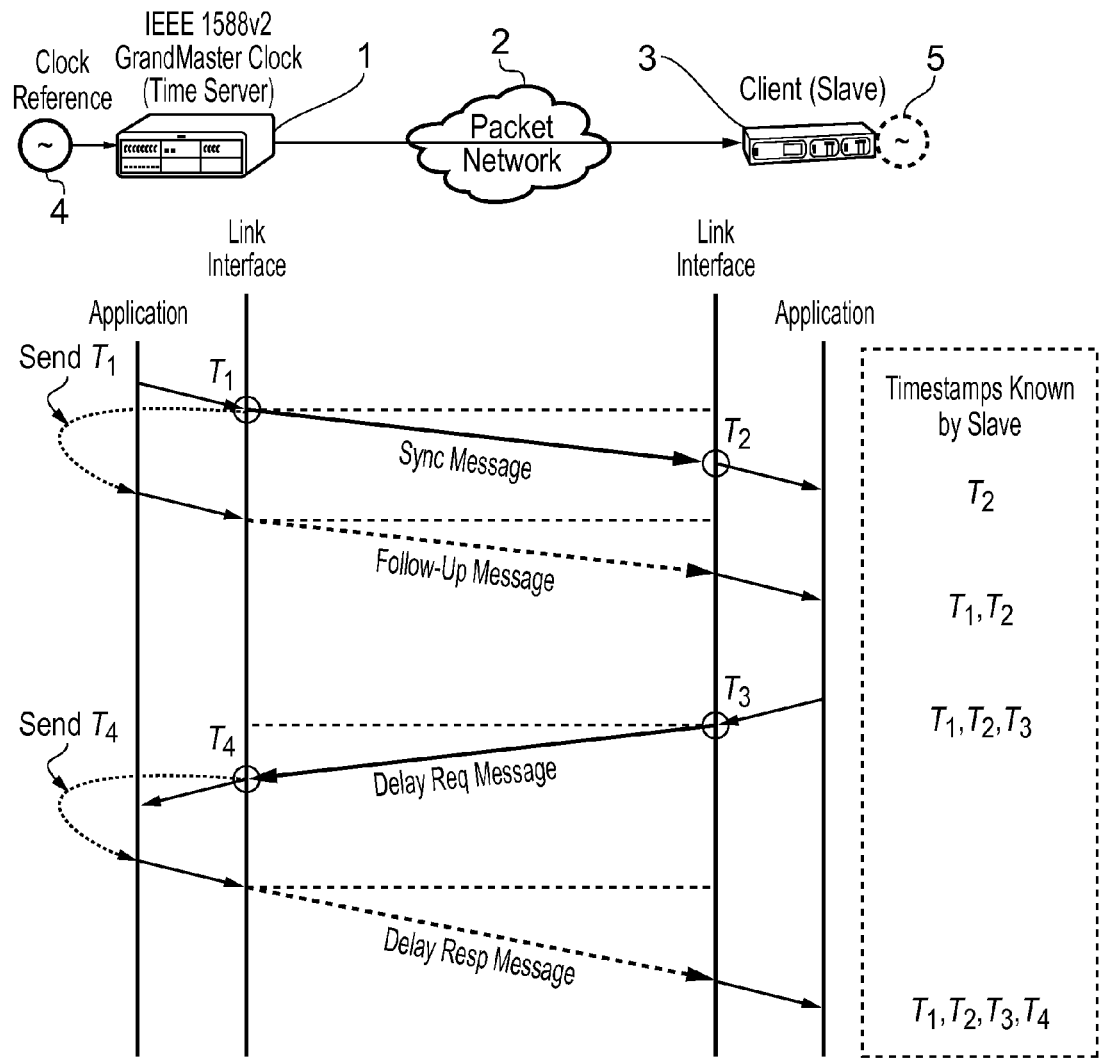
FIG. 1 shows the message flow in a two-step clock under IEEE 1588 PTP and has already been described.
Figure 2:
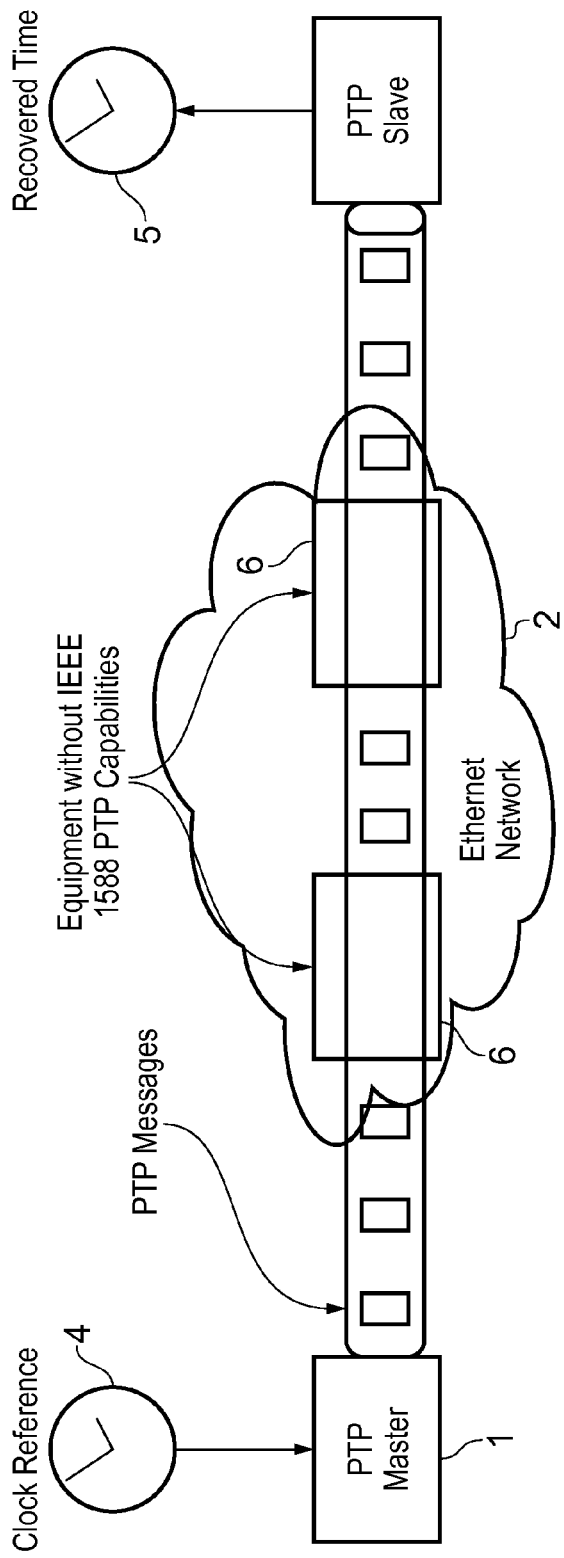
FIG. 2 shows end-to-end time/frequency transfer over a network and has already been described.
Figure 3:
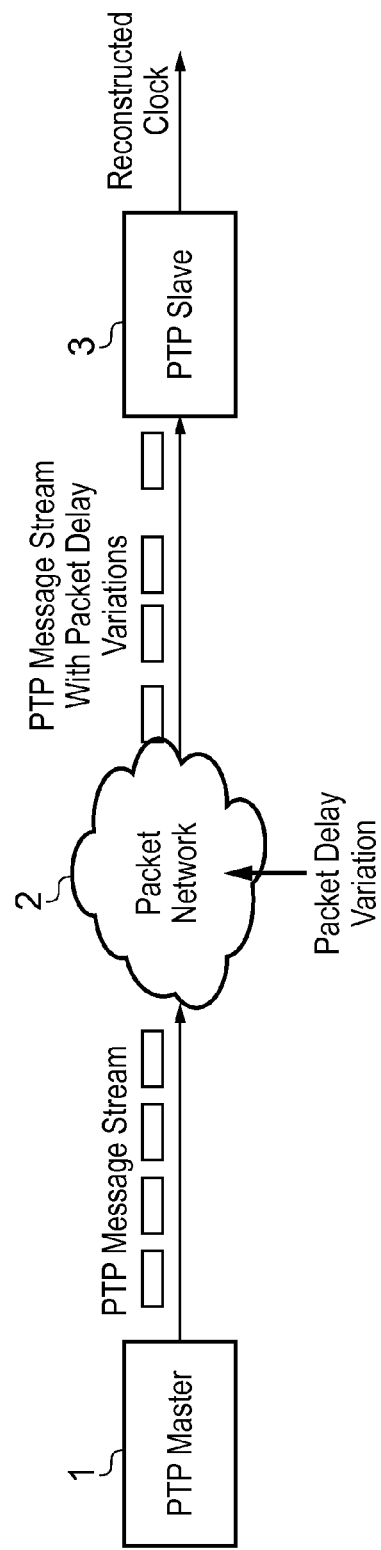
FIG. 3 shows, in schematic form, the effect of Packet Delay Variation in a packet network and has already been described.
Figure 4:
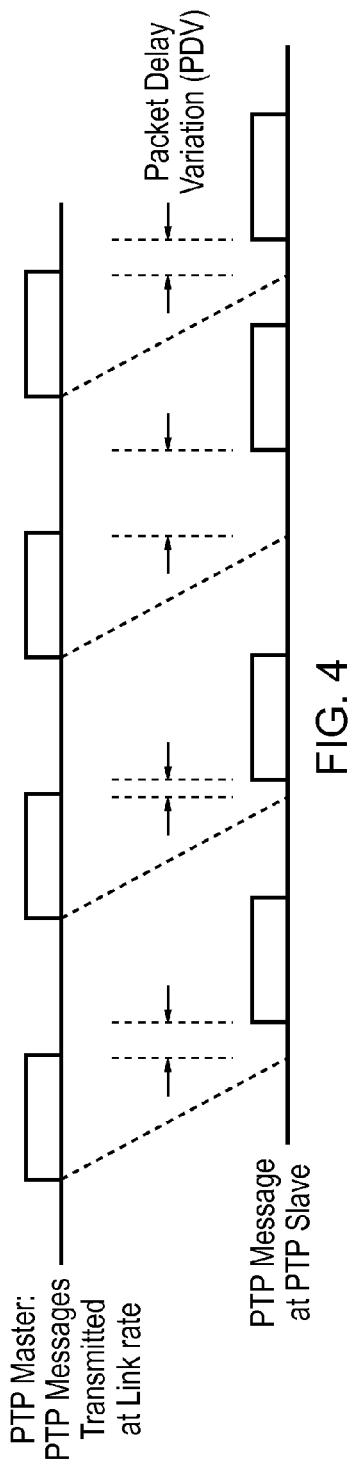
FIG. 4 shows the effects of Packet Delay Variation on a PTP message stream and has already been described.

At their broadest, slave devices of the present invention are arranged to synchronize a slave clock in the slave device to a master clock by solving a linear programming problem to derive an estimate of the skew and offset of the slave clock relative to the master clock.

A first aspect of the present invention provides a slave device connected to a master device having a master clock over a network, wherein the slave device includes a slave clock, and wherein: the slave device is arranged to: exchange with the master device, timing messages and record timestamps which are: the time of sending of said timing messages from the master device according to the master clock; the time of receipt of said timing messages according to the slave clock; the time of sending of said timing messages according to the slave clock; and the time of receipt of said timing messages according to the master clock; formulate a linear programming problem which seeks to minimize the expression $\theta_f - \theta_r$ in which $\theta_f$ is the offset of the slave clock compared to the master clock, derived from timing messages sent from the master to the slave and $\theta_r$ is the offset derived from timing messages sent from the slave to the master, subject to the constraints that $T_{1,n} \geq (1+\alpha)T_{2,n} + \theta_f$, $T_{4,n} + \alpha)T_{3,n} + \theta_r$ and $\theta_f - \theta_r \geq 0$ wherein: a is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock; solve the linear programming problem to derive an estimate of the skew and offset of the slave clock relative to the master clock; and synchronize the slave clock to the master clock based on the estimated skew and offset to produce a master time estimate.

The network is may be a packet network (using technologies such Ethernet, IP, MPLS, etc.).

The timing messages are preferably timing messages under the IEEE 1588 Precision Time Protocol (PTP).

By using the linear programming approach set out above, accurate timing information (time and frequency) may be transported from a master (server) clock in an end-to-end fashion over a packet network and accurately recovered at the slave (client) device.

The slave device of this aspect requires no assistance from the packet network in its synchronization operation and is still able to provide sub-microsecond level clock accuracies.

The slave device of this aspect uses a two-dimensional linear programming technique for estimating clock offset and skew from two-way timing message exchanges. This technique has the simplicity of the linear-programming technique using one-way delay measurements but the accuracy and robustness of the extended convex hull technique. The proposed linear programming technique for estimating the clock offset and skew of a slave clock with respect to a master clock does not require knowledge of the measurement and process noise statistics as in Kalman filtering based techniques.

Preferably the slave clock includes a local free-running oscillator and a skew-adjusted free-running counter driven by the output of said local free-running oscillator, and the slave device is arranged to synchronize the frequency of the slave clock to the frequency of the master clock by adjusting the skew-adjusted free-running counter to take account of the estimated skew and applying the estimated offset to the output of the skew-adjusted free-running counter to produce the master time estimate.

Preferably the slave device has a memory area storing a signed skew compensation factor derived from said estimate of the skew which is added to the skew-adjusted free-running counter at each clock cycle of the local free-running oscillator.

By adding (or subtracting, where the sign is negative) the skew compensation factor to the skew-adjusted free-running counter at each clock cycle, the counter evolution can follow the computed server time estimate. With the adjustment of the counter increments, the evolution of the skew-adjusted free-running counter can provide both a time signal and a frequency signal.

More preferably the skew compensation factor is an adjustment factor representing a fractional nanosecond adjustment to be applied to the skew-adjusted free-running counter. This allows for highly accurate adjustment of the counter to account for the minor effects of the skew in terms of parts per million (ppm).

In some embodiments, the skew-adjusted free-running counter is also used to provide timestamps for the time of receipt and of sending of timing messages at/from the slave device.

In these embodiments the counter may be initialized on receipt by the slave device of the first timing message from the master device, and the counter is reset on receipt of the first master time estimate to said first master time estimate.

In alternative embodiments the slave device further comprises a second free-running counter driven by the output of the local free-running oscillator, wherein the second counter is used to provide timestamps for the time of receipt and sending of timing messages at/from the slave device.

In preferred embodiments, the slave device further includes a first programmable register storing scheduled event times and a comparator, wherein the comparator is arranged to compare the master time estimate to the event times stored in said register and produce an output signal when there is a match.

This can provide for a highly accurate timing pulse signal for scheduled events.

In a development of the above embodiments the slave device includes a second programmable register storing an event period and is arranged to produce a pulsed output signal by incrementing a scheduled event time stored in said first programmable register by the event period stored in said second programmable register each time a match is found by the comparator.

In this development a highly accurately spaced pulse train can be generated which can be used as a digitally synthesized clock signal of programmable frequency (the frequency being determined by the stored event period).

Such a pulse train or clock signal, particularly when both registers store times to a fractional nanosecond level, can be used to synthesize a highly accurate clock signal which is a non-integer factor of the local oscillator frequency. For example, reference frequencies for telecom systems may be generated by this technique.

Preferably the pulsed output of the comparator is conditioned using a phase locked loop to reduce the jitter in the output. Some jitter in the pulse train output is inevitably produced by the quantization introduced by the local oscillator clock steps. If this inherent jitter is too large, then the quality of the clock signal output from the comparator may not satisfy the end application requirements. In such circumstances a phase locked loop may be used to condition the signal.

Further operations may be carried out on the output pulse train to construct a suitable clock signal for the end application, for example to create square wave or sine wave formats.

The slave device of this aspect preferably operates by carrying out the relevant steps of a method according to the second aspect described below.

The slave device of the present aspect may include any combination of some, all or none of the above described preferred and optional features.

At their broadest, methods of the present invention aim to synchronize a slave clock in the slave device to a master clock by solving a linear programming problem to derive an estimate of the skew and offset of the slave clock relative to the master clock.

A second aspect of the present invention provides a method of synchronizing the time and frequency of a slave clock in a slave device to a master clock in a master device which is connected to the slave device over a network, the method including the steps of: exchanging, between the master device and the slave device, timing messages and timestamps which are: the time of sending of timing messages from the master device according to the master clock; the time of receipt of said timing messages according to the slave clock; the time of sending of said timing messages according to the slave clock; and the time of receipt of said timing messages according to the master clock; formulating a linear programming problem which seeks to minimize the expression $\theta_f - \theta_r$, in which $\theta_f$ is the offset of the slave clock compared to the master clock, derived from timing messages sent from the master to the slave and $\theta_r$ is the offset derived from timing messages sent from the slave to the master, subject to the constraints that $T_{1,n} \geq (1+\alpha)T_{2,n} + \theta_f$, $T_{4,n} \leq (1+\alpha)T_{3,n} + \theta_r$ and $\theta_f - \theta_r \geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock; solving the linear programming problem to derive an estimate of the skew and offset of the slave clock relative to the master clock; and synchronizing the slave clock to the master clock based on the estimated skew and offset to produce a master time estimate.

The network is may be a packet network (using technologies such Ethernet, IP, MPLS, etc.).

The timing messages are preferably timing messages under the IEEE 1588 Precision Time Protocol (PTP).

By using the linear programming approach set out above, accurate timing information (time and frequency) may be transported from a master (server) clock in an end-to-end fashion over a packet network and accurately recovered at the slave (client) device.

The method of this aspect requires no assistance from the packet network in its synchronization operation and is still able to provide sub-microsecond level clock accuracies at the slave device.

The method of this aspect uses a two-dimensional linear programming technique for estimating clock offset and skew from two-way timing message exchanges. This technique has the simplicity of the linear-programming technique using one-way delay measurements but the accuracy and robustness of the extended convex hull technique. The proposed linear programming technique for estimating the clock offset and skew of a slave clock with respect to a master clock does not require knowledge of the measurement and process noise statistics as in Kalman filtering based techniques.

Preferably the slave clock includes a local free-running oscillator and a skew-adjusted free-running counter driven by the output of said local free-running oscillator, and the step of synchronizing includes the steps of: synchronizing the frequency of the slave clock to the frequency of the master clock by adjusting the skew-adjusted free-running counter to take account of the estimated skew and applying the estimated offset to the output of the skew-adjusted free-running counter to produce the master time estimate.

Preferably the method further includes the steps of: storing a signed skew compensation factor derived from said estimate of the skew in a memory area; and adding said compensation factor to the skew-adjusted free-running counter at each clock cycle of the local free-running oscillator.

By adding (or subtracting, where the sign is negative) the skew compensation factor to the skew-adjusted free-running counter at each clock cycle, the counter evolution can follow the computed server time estimate. With the adjustment of the counter increments, the evolution of the skew-adjusted free-running counter can provide both a time signal and a frequency signal.

More preferably the skew compensation factor is an adjustment factor representing a fractional nanosecond adjustment to be applied to the skew-adjusted free-running counter. This allows for highly accurate adjustment of the counter to account for the minor effects of the skew in terms of parts per million (ppm).

In some embodiments, the skew-adjusted free-running counter is also used to provide timestamps for the time of receipt and of sending of timing messages at/from the slave device.

In these embodiments the method may further include the steps of initializing the counter on receipt by the slave device of the first timing message from the master device, and resetting the counter to said first master time estimate on receipt of the first master time estimate.

In alternative embodiments the slave device further comprises a second free-running counter driven by the output of the local free-running oscillator, wherein the second counter is used to provide timestamps for the time of receipt and sending of timing messages at/from the slave device.

In preferred embodiments, the slave device further includes a first programmable register storing scheduled event times and the method further includes the steps of comparing the master time estimate to the event times stored in said register and producing an output signal when there is a match.

In a development of the above embodiments, the slave device includes a second programmable register storing an event period and the method further includes the step of incrementing a scheduled event time stored in said first programmable register by the event period stored in said second programmable register each time a match is found by the comparator to produce a pulsed output signal.

This can provide for a highly accurate timing pulse signal for scheduled events.

In this development a highly accurately spaced pulse train can be generated which can be used as a digitally synthesized clock signal of programmable frequency (the frequency being determined by the stored event period).

Such a pulse train or clock signal, particularly when both registers store times to a fractional nanosecond level, can be used to synthesize a highly accurate clock signal which is a non-integer factor of the local oscillator frequency. For example, reference frequencies for telecom systems may be generated by this technique.

Preferably the pulsed output of the comparator is conditioned using a phase locked loop to reduce the jitter in the output. Some jitter in the pulse train output is inevitably produced by the quantization introduced by the local oscillator clock steps. If this inherent jitter is too large, then the quality of the clock signal output from the comparator may not satisfy the end application requirements. In such circumstances a phase locked loop may be used to condition the signal.

Further operations may be carried out on the output pulse train to construct a suitable clock signal for the end application, for example to create square wave or sine wave formats.

The method of the present aspect may include any combination of some, all or none of the above described preferred and optional features.

The methods of the above aspect is preferably implemented by a slave device according to the first aspect of this invention or in a system according to the third aspect of this invention, as described below, but need not be.

Further aspects of the present invention include computer programs for running on computer systems which carry out the methods of the above aspect, including some, all or none of the preferred and optional features of that aspect.

At their broadest, systems of the present invention are arranged to synchronize a slave clock in the slave device to a master clock in a master device by solving a linear programming problem to derive an estimate of the skew and offset of the slave clock relative to the master clock A third aspect of the present invention provides a time and frequency synchronisation system for a network, the system including: a master device having a master clock; a slave device having a slave clock; and a network connecting the master and slave devices, wherein: the slave clock comprises a slave clock; and the slave device is arranged to: exchange with the master device, timing messages and to record timestamps which are: the time of sending of said timing messages from the master device according to the master clock; the time of receipt of said timing messages according to the slave clock; the time of sending of said timing messages according to the slave clock; and the time of receipt of said timing messages according to the master clock; formulate a linear programming problem which seeks to minimize the expression $\theta_f - \theta_r$, in which $\theta_f$ is the offset of the slave clock compared to the master clock, derived from timing messages sent from the master to the slave and $\theta_r$ is the offset derived from timing messages sent from the slave to the master, subject to the constraints that $T_{1,n} \geq (1+\alpha)T_{2,n} + \theta_f$, $T_{4,n} \leq (1+\alpha)T_{3,n} + \theta_r$ and $\theta_f - \theta_r \geq 0$ wherein: a is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock; solve the linear programming problem to derive an estimate of the skew and offset of the slave clock relative to the master clock; and synchronize the slave clock to the master clock based on the estimated skew and offset to produce a master time estimate.

The network is may be a packet network (using technologies such Ethernet, IP, MPLS, etc.).

The timing messages are preferably timing messages under the IEEE 1588 Precision Time Protocol (PTP).

By using the linear programming approach set out above, accurate timing information (time and frequency) may be transported from a master (server) clock in an end-to-end fashion over a packet network and accurately recovered at the slave (client) device.

The slave device of this aspect requires no assistance from the packet network in its synchronization operation and is still able to provide sub-microsecond level clock accuracies.

The slave device of this aspect uses a two-dimensional linear programming technique for estimating clock offset and skew from two-way timing message exchanges. This technique has the simplicity of the linear-programming technique using one-way delay measurements but the accuracy and robustness of the extended convex hull technique. The proposed linear programming technique for estimating the clock offset and skew of a slave clock with respect to a master clock does not require knowledge of the measurement and process noise statistics as in Kalman filtering based techniques.

Preferably the slave clock includes a local free-running oscillator and a skew-adjusted free-running counter driven by the output of said local free-running oscillator, and the slave device is arranged to synchronize the frequency of the slave clock to the frequency of the master clock by adjusting the skew-adjusted free-running counter to take account of the estimated skew and applying the estimated offset to the output of the skew-adjusted free-running counter to produce the master time estimate.

Preferably the slave device has a memory area storing a signed skew compensation factor derived from said estimate of the skew which is added to the skew-adjusted free-running counter at each clock cycle of the local free-running oscillator.

By adding (or subtracting, where the sign is negative) the skew compensation factor to the skew-adjusted free-running counter at each clock cycle, the counter evolution can follow the computed server time estimate. With the adjustment of the counter increments, the evolution of the skew-adjusted free-running counter can provide both a time signal and a frequency signal.

More preferably the skew compensation factor is an adjustment factor representing a fractional nanosecond adjustment to be applied to the skew-adjusted free-running counter. This allows for highly accurate adjustment of the counter to account for the minor effects of the skew in terms of parts per million (ppm).

In some embodiments, the skew-adjusted free-running counter is also used to provide timestamps for the time of receipt and of sending of timing messages at/from the slave device.

In these embodiments the counter may be initialized on receipt by the slave device of the first timing message from the master device, and the counter is reset on receipt of the first master time estimate to said first master time estimate.

In alternative embodiments the slave device further comprises a second free-running counter driven by the output of the local free-running oscillator, wherein the second counter is used to provide timestamps for the time of receipt and sending of timing messages at/from the slave device.

In preferred embodiments, the slave device further includes a first programmable register storing scheduled event times and a comparator, wherein the comparator is arranged to compare the master time estimate to the event times stored in said register and produce an output signal when there is a match.

This can provide for a highly accurate timing pulse signal for scheduled events.

In a development of the above embodiments the slave device includes a second programmable register storing an event period and is arranged to produce a pulsed output signal by incrementing a scheduled event time stored in said first programmable register by the event period stored in said second programmable register each time a match is found by the comparator.

In this development a highly accurately spaced pulse train can be generated which can be used as a digitally synthesized clock signal of programmable frequency (the frequency being determined by the stored event period).

Such a pulse train or clock signal, particularly when both registers store times to a fractional nanosecond level, can be used to synthesize a highly accurate clock signal which is a non-integer factor of the local oscillator frequency. For example, reference frequencies for telecom systems may be generated by this technique.

Preferably the pulsed output of the comparator is conditioned using a phase locked loop to reduce the jitter in the output. Some jitter in the pulse train output is inevitably produced by the quantization introduced by the local oscillator clock steps. If this inherent jitter is too large, then the quality of the clock signal output from the comparator may not satisfy the end application requirements. In such circumstances a phase locked loop may be used to condition the signal.

Further operations may be carried out on the output pulse train to construct a suitable clock signal for the end application, for example to create square wave or sine wave formats.

The system of this aspect preferably operates by carrying out a method according to the above described second aspect.

The system of the present aspect may include any combination of some, all or none of the above described preferred and optional features.

Basic Clock Model

In order to understand the embodiments below, a generalized clock offset and skew equation for our synchronization problem needs to be defined. Firstly, some terminology used to describe clock behavior is set out:

Clock: To take into account the restrictions of real clocks, clocks are modeled as piecewise continuous, strictly monotonic increasing functions. A clock is a function that is twice differentiable except on a finite set of points: $F: \Re \rightarrow \Re$ where $F'(t) \equiv dF(t)/dt$ and $F''(t) \equiv d^2F(t)/dt^2$ exists everywhere except for $t \in P \subset \Re$ where $|P|$ is finite.

A typical hardware clock consists of a quartz crystal oscillator and a counter that is incremented by one every oscillation period (e.g., upon detection of a falling or rising edge). If the period T of the oscillator is known, the counter F can be used to obtain approximate measurements of real-time intervals in multiples of T. More formally, the clock counter displays the value $F(t)$ at real time t and is incremented by one at a frequency $f=1/T$. The rate of the clock counter is defined as $f(t)=dF(t)/dt$.

In some computer systems, abrupt time adjustment is made possible through a time resetting system call. The piecewise nature of the clock function accommodates the abrupt time adjustment.

"True" Clock: An "true" clock is a reference clock that generates "true" time at any moment, and runs at a constant rate. Let $F_t$ denote the "true" clock and it is given by the identity function $F_t = t$ and $P_t = 0$.

Local Clock: A local clock is a physical clock device, modeled as a function $G: \Re \rightarrow \Re$. In general, the notion of the local clock is used to refer to the local clock of the time client. The single local clock of the time client is denoted as $C = L_{clock}$ (free-running hardware clock). We denote S as the server clock.

Logical Clock: A logical clock is a function $H: \Re \rightarrow \Re$. It is a virtual clock, realized most often in software on a device that has a local clock. The notation $H(L_{clock})$ is used to denote the logical time that occurs at local time $L_{clock}$. Note that the argument of the logical clock function always is a local time. The estimate of the server time at the client at local clock time $L_{clock}$ is denoted as $\hat{S}(L_{clock})$.

Timestamp: A clock whether physical or virtual can be used to associate an event with time. The time of a single event is called a timestamp and is a real number.

Offset: Consider the time server and time client clocks, S and C, respectively. The difference or offset between the time reported by the clock S and the "true" time is (S(t)−t). The offset of the clock S relative to C at time t≥0 is θ(t)=(C(t)−S(t)); this is called relative offset.

Frequency: This is the rate at which a clock progresses. The frequency at time t of S is S'(t).

Skew: This is the difference in the frequencies of a clock and the "true" clock. The skew of S relative to C at time t≥0 is α(t)=(C'(t)−S'(t)); this is called relative skew.

An ideal (or "true") clock would have a rate of 1 at all times. However, the period of the oscillator and hence the clock rate depend on various parameters such as the manufacture (the cut), aging of the crystal, supply voltage, environmental temperature and humidity, vibration and/or shock. The effects of these factors can, however, be minimized by the quality and type of the oscillator (e.g., oven or double oven compensated oscillator, pre-aging, and oscillator characterization). Taking the client clock C, for instance, the skew is formally defined as the deviation of the rate from 1 or $\alpha_c(t)=(C'(t)-1)$. Since network devices are typically operated under well-defined ranges of the above parameters, it is reasonable to assume a maximum skew $\alpha_{c\ max}$, such that $|\alpha_c(t)|=\alpha_{c\ max}$ for all t. Typical values for $\alpha_{c\ max}$ are 1 ppm to 100 ppm, where 1 ppm (parts per million)=$10^{-6}$.

Note: Two clocks are said to be synchronized at a particular moment if both the relative offset θ and skew α are zero.

In this document the relative offset and relative skew will be referred to simply as offset and skew, respectively.

Drift: The drift of clock S is S''(t). The drift of S relative to C at time t≥0 is μ(t)=(C''(t)−S''(t))

Clock Ratio: Another useful parameter for describing clock behavior is the clock ratio. This is defined as the ratio of the frequencies of two clocks. The frequency ratio between a clock C and the true clock is C'(t)/1. The ratio γ of C relative to S at time t is C'(t)/S'(t). The relationship between the clock ratio and the skew is:

$$\alpha(t)=C'(t)-S'(t)=\gamma S'(t)-S'(t)=(\gamma-1)S'(t)$$

Clock Resolution: This is the smallest unit greater than zero by which the clock's time is updated (also called the tick). The accuracy of delay measurements is limited by the resolution of the clocks of the two end-systems.

In reality, a clock is step function with increments at every unit of its time resolution. However, in modeling clocks, the time reports by a real clock with fixed minimum resolution are considered as samples of a continuous function at specific moments, thus circumventing the discretization effect of the real clock.

Finally there are two terms that are used in describing clock behavior and quality:

Jitter: Timing jitter is the short term variation of a digital signal's significant instant from their ideal positions in time, where short term implies phase oscillations of frequency greater than or equal to 10 Hz. Significant instants include for instance, optimum sampling instants.

Wander: Long term variations, where the variations are of frequency less than 10 Hz, are called wander.

Figure 5:
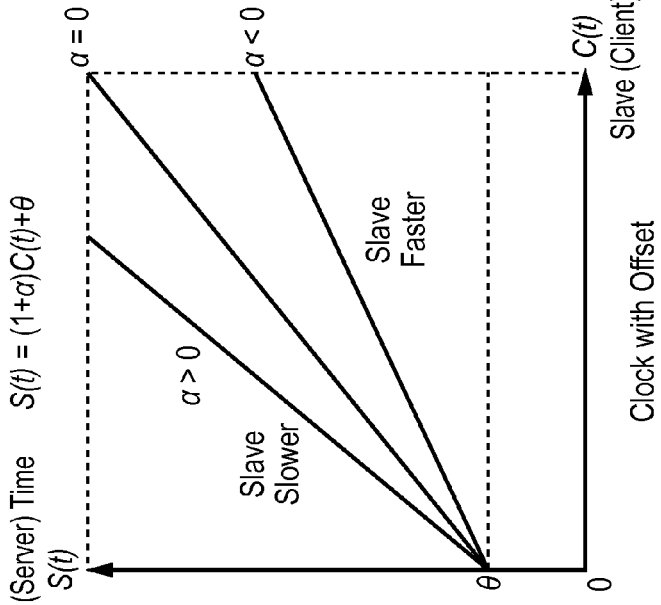
FIG. 5 shows simple models of the effect of clock skew on clocks with and without offset.
Figure 6:
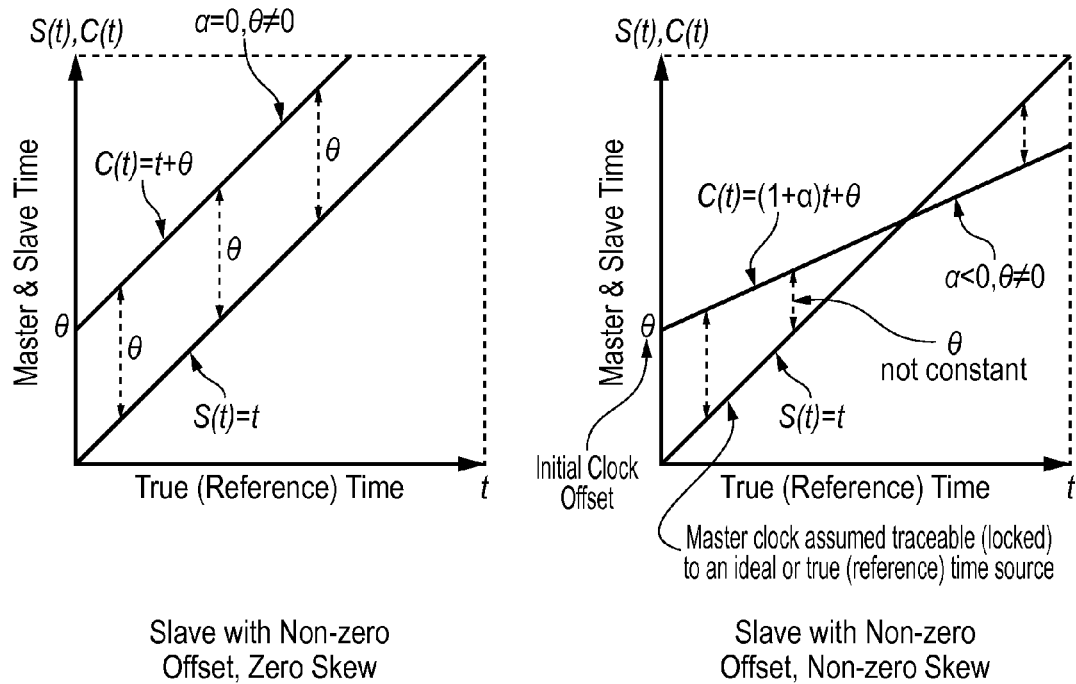
FIG. 6 shows the behaviour of master and slave clocks with respect to a true (reference) time source.

It is assumed that at any particular time instant, the instantaneous view of the relationship between the master (server) clock with timeline S(t) and the slave (client) clock with timeline C(t), can be described by the well-know simple skew clock model depicted in FIG. 5, and described by the equation, $$S(t)=(1+\alpha)C(t)+\theta, \quad (1)$$

where the skew α is a very small quantity in the order of parts-per-million. This snapshot is an instantaneous view of how well the two clocks are (mis)aligned. FIG. 5 illustrates the influence of θ and α on the alignment. The relationship between the master and slave clocks with respect to the true (reference) time source is shown in FIG. 6.

The above equation can be extended to account for the case where the master clock and slave clock exchange messages over a communication link with delay. Assuming that the nth Sync message travelling from a master to a slave experiences a (fixed plus variable or stochastic) delay of $d_{f,n}$. Similarly, it is assumed the nth Delay_Req message sent from the slave to the master experiences a (fixed plus variable or stochastic) delay of $d_{r,n}$. It is further assumed that the fixed delay components in both directions are equal (symmetric communication paths) but the messages experience variables delays such queuing delays. The master and slave exchange messages using the delay-request delay-response mechanism described in FIG. 1.

For the nth Sync message (FIG. 1) which departs the master with timestamp $T_{1,n} \in S(t)$ and arrives at the slave with timestamp $T_{2,n} \in C(t)$ after having experienced a delay $d_{f,n}$, the simple skew clock model above can be extended to account for the travel time $d_{f,n}$ to obtain the following expression $$(T_{1,n}+d_{f,n})=(1+\alpha)T_{2,n}+\theta_f \quad (2)$$

where $\theta_f$ is the offset derived from Sync message transfers. For the nth Delay_Req message which departs the slave with timestamp $T_{3,n} \in C(t)$ and arrives at the master with timestamp $T_{4,n} \in S(t)$ after having experienced a delay $d_{r,n}$, the following expression is obtained $$(T_{4,n}-d_{r,n})=(1+\alpha)T_{3,n}+\delta_r, \quad (3)$$

where $\theta_r$ is the offset derived from Delay_Req message transfers.

Below a two-dimensional (i.e., two-variable) linear programming technique according to an embodiment of the present invention for computing offset θ and α when given N number of Sync and Delay_Req message exchanges is set out.

2-Dimensional Linear Programming Technique for Clock Offset and Skew Estimation

Figure 7:
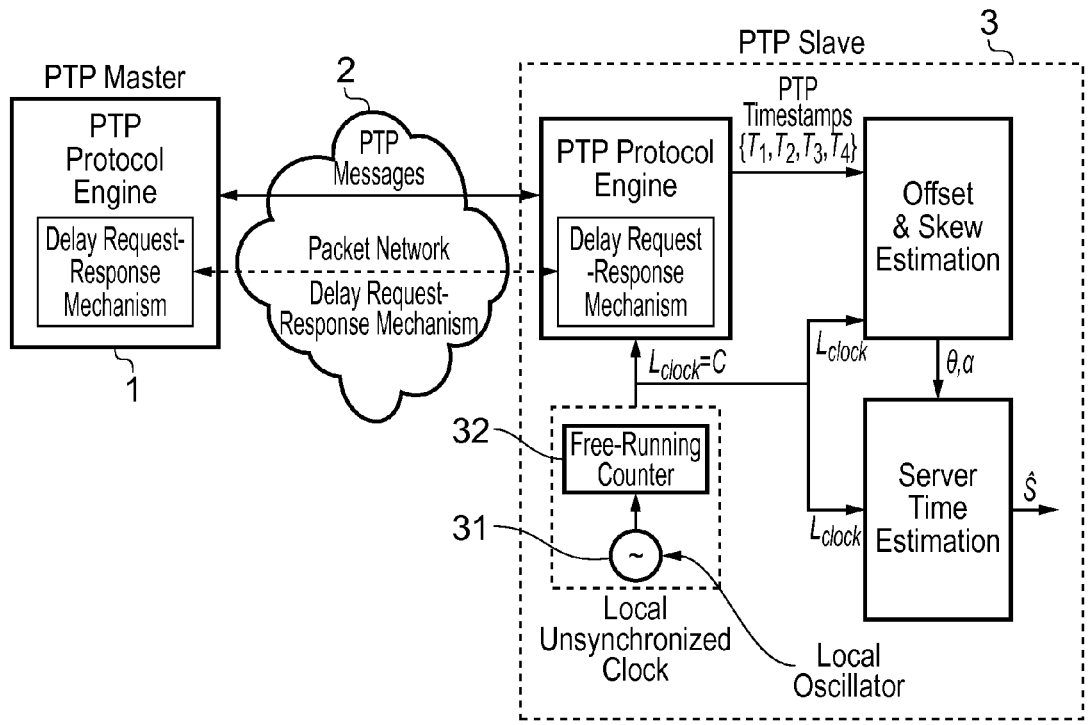
FIG. 7 shows the processing carried out by a slave device according to an embodiment of the present invention.

FIG. 7 shows the main blocks of the synchronization technique according to an embodiment of the present invention at the time client 3. A free running local oscillator 31 is used together with the estimated clock parameters to synthesize a synchronized local clock 5 which is an estimated image of the server clock 4. The frequency of this client's local oscillator 31 is not adjusted, but it is allowed to free-run. This free running counter 32 is used for timestamping and for synthesizing an image of the server clock (synchronized local clock) for the time client. The timestamps indicated in FIG. 7 at the client are with respect to this local clock.

From equation (2), we get the following expressions for the nth Sync (downstream) message flows $$T_{1,n} \leq (1+\alpha)T_{2,n}+\delta_f \quad (4)$$

from which the boundary of the cloud of downstream timestamps is $$T_{1,n} = (1+\alpha)T_{2,n} + \theta_f \quad (5)$$

which is of the form $$y = (1+\alpha)x + \theta_f \quad (6)$$

where $y \in T_{1,n}$, $T_{4,n} \in S(t)$ and $x \in T_{2,n}$, $T_{3,n} \in C(t)$. The cloud of downstream timestamps generated as a result of path propagation delay and queuing delays can lie (or spread) below this line but the "true" line relating master and slave clocks must NOT. This means, the line relating the master and slave clocks, must lie ON or ABOVE this boundary (line). This results in the following constraint for the downstream cloud $$T_{1,n} \geq (1+\alpha)T_{2,n} \theta_f \quad (7)$$

or $$y \geq (1+\alpha)x + \theta_f \quad (8)$$

From (3), we get the following expression for the nth Delay_Req (upstream) message flows $$T_{4,n} \geq (1+\alpha)T_{3,n} + \theta_r \quad (9)$$

which also produces the boundary of the cloud of upstream timestamps as $$T_{4,n} = (1+\alpha)T_{3,n} + \theta_r \quad (10)$$

which is also of the form $$y = (1+\alpha)x + \theta_r \quad (11)$$

Here too, the cloud of upstream timestamps generated as a result of path propagation delay and queuing delays can lie above this line but the "true" line relating master and slave clocks must NOT. The line relating the master and slave clocks, must lie ON or BELOW this boundary (line). This results in the following constraint for the downstream cloud $$T_{4,n} \leq (1+\alpha)T_{3,n} + \theta_r \quad (12)$$

which is also of the form $$y \leq (1+\alpha)x + \theta_r \quad (13)$$

Figure 8:
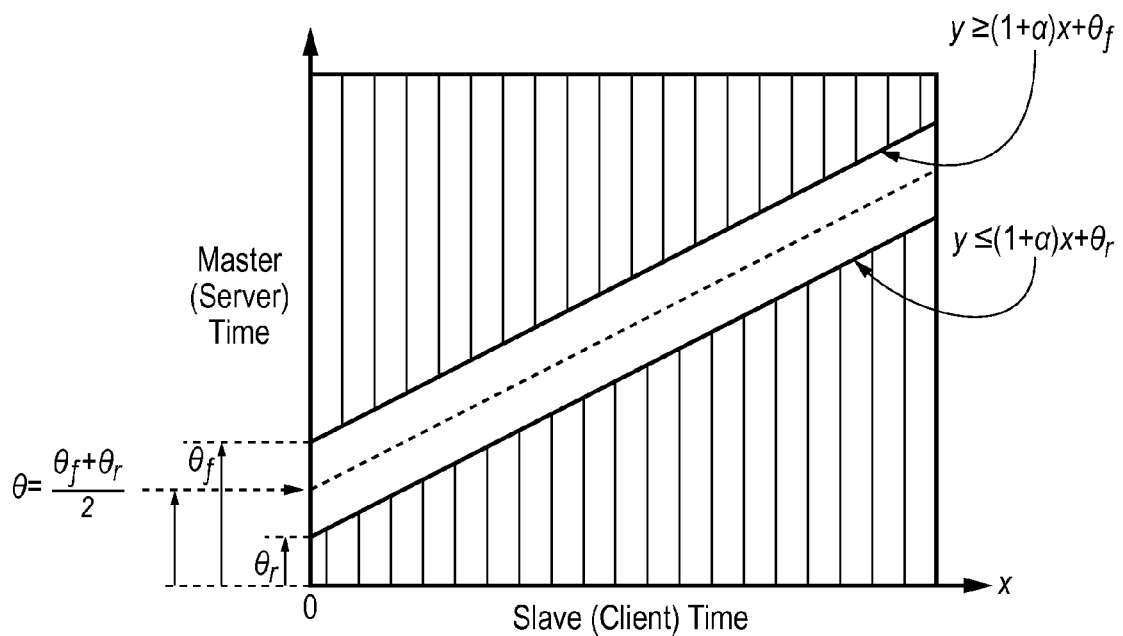
FIG. 8 illustrates the two constraints in the linear programming formulation according to an embodiment of the present invention.

The two constraints (7) and (12) are illustrated in FIG. 8. These two constraints can be interpreted as the constraints of a linear program which suggests a line (dashed line in FIG. 8) that separates the downstream cloud of timestamps and upstream cloud of timestamps. The clock offset parameters $\theta_f$ and $\theta_r$ ideally should be the same or extremely close together since they relate to the same clocks (master and slave). We are therefore trying to find the smallest corridor (defined by the constraints (7) and (12)) that gives us the smallest difference between $\theta_f$ and $\theta_r$. The idea here is to estimate parameters that will make the two parallel lines in FIG. 8 as close together as possible, that is, make the lane between these two lines as small as possible. The estimation algorithm strives to identify the two parallel lines $y=(1+\alpha)x+\theta_f$ (line bordering the downstream cloud) and $y=(1+\alpha)x+\theta_r$ (line bordering upstream cloud) with the condition that $\theta_f-\theta_r$ is minimized to allow the two lines to fit just at the edge of the two clouds.

A linear programming formulation that seeks to place these two parallel lines as wide apart as possible is as follows.

Minimize $\theta_f - \theta_r$ s.t.

$$T_{1,n} \geq (1+\alpha)T_{2,n} + \theta_f \quad n \in \{1,2,\ldots,N\},$$

$$T_{4,n} (1+\alpha)T_{3,n} + \theta_r, \quad n \in \{1,2,\ldots,N\},$$

$$\theta_f - \theta_r \geq 0 \quad (14)$$

There are efficient methods (including off-the-shelf linear time algorithms) available for solving two-dimensional linear programming problems such as the above. The skew $(1+\alpha)$ and the offset parameters $\theta_f$ and $\theta_r$ can easily be solved for from which the slave clock offset from the master $\theta$ can be calculated $$\theta = \frac{\theta_f + \theta_r}{2} \quad (15)$$

Figure 9:
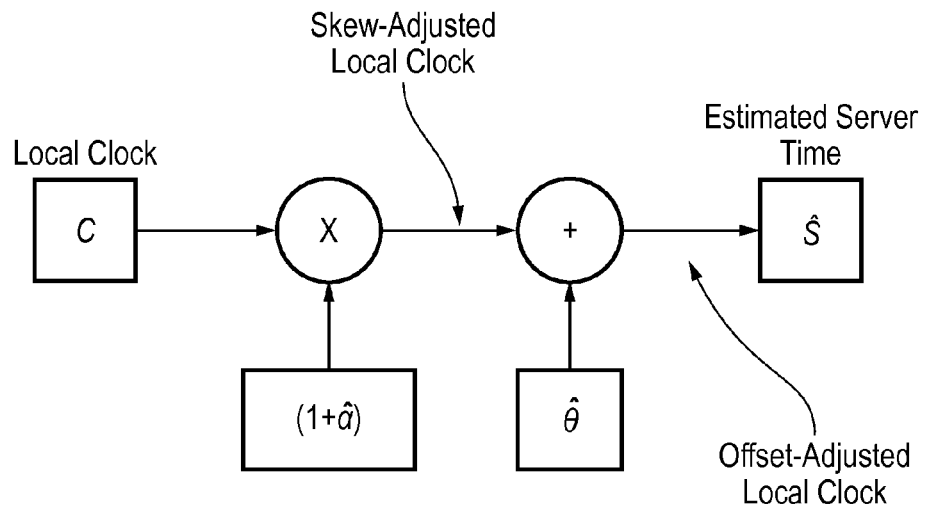
FIG. 9 shows the process for estimation of server time at the slave device.

The skew and offset can then be used to compute the server time estimate as illustrated in FIG. 9. A hardware-based method for synthesizing at the slave time and frequency signals that are synchronized to the master according to an embodiment of the invention is set out below.

Proposed Clock Recovery Architecture

Figure 10:
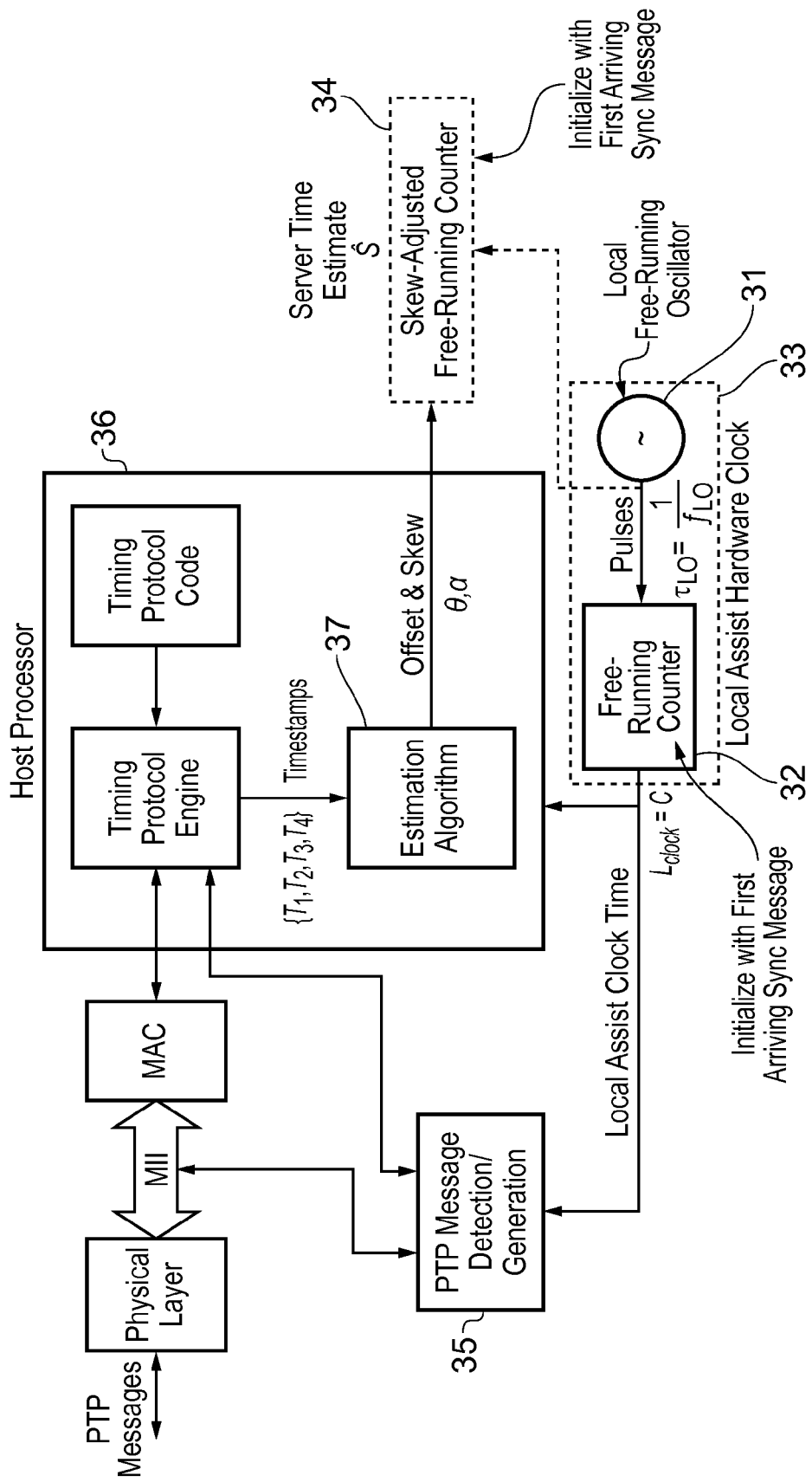
FIG. 10 shows the architecture of a slave device according to an embodiment of the present invention.

The clock offset ($\hat{\theta}$) and skew ($\hat{\alpha}$) estimated at the client using the two-dimensional linear programming technique over multiple periods of the Sync message broadcast is used to compute the server time $\hat{S}$ as illustrated in FIG. 9. FIG. 10 shows the main blocks of the proposed synchronization technique at the time client. A free running local client oscillator 31 is used together with the estimated clock offset and skew to derive the server clock estimate $\hat{S}$. The offset and skew are applied to the local free-running clock 33 (local assist hardware clock) in order to arrive at a local time value that is synchronized to the master clock 4.

The free-running counter 32 (i.e., local assist hardware clock) is used for timestamping PTP messages, computing clock offsets and skews, and generating the recovered clock signals. The free-running counter 32 runs on the local system clock, asynchronously to the master clock 4 or clocks maintained by the other clients of the PTP network. FIG. 10 also includes an offset and skew-adjusted free-running counter 34 (simply called skew-adjusted free-running counter) that can be adjusted with correction or compensation factors derived from the computed skew and offset so that it can be synchronized to the master clock 4. Both free-running counters are driven from a common local reference oscillator but with one counter providing raw time for timestamping, offset and skew computation, while the other which is adjustable, provides a time synchronized to the master. The PTP time value consists of a 32-bit nanoseconds field and a 48-bit seconds field. At each rollover of the nanoseconds [31:0] field ($10^9$ nanoseconds or 1 second), the 48-bit seconds [47:0] counter is incremented.

The message detection/generation block 35 performs timestamping of PTP messages and passes this information to the host processor 36. The estimation algorithm 37 running on the host processor 36 uses the information in the PTP messages to compute the skew, offset and server time estimate. If the system does not require a continuous synchronized clock signal output, the skew and offset adjustments can be performed purely in software. The PTP application must maintain its own free-running clock and perform skew and offset adjustments in software based on the slave values it calculates from each PTP message. Mobile base stations, for example, will require continuous synchronized clock signals, which means the system must provides the necessary logic to perform hardware-based skew and offset adjustments to the local clock 33. This requires a hardware skew and offset adjustment functionality and also functionality to provide a hardware synchronized time-of-day value and to synthesize a clock signal for use externally by end applications.

The idea of having a skew-adjusted free-running counter 34 can be explained as follows. If the observation of slave offset values calculated from the PTP messages tend to increase or decrease over time, then it means the local reference oscillator 31 that increments the free-running counter 32 is operating at a rate slightly slower or faster than the master clock 4. This implies that a skew adjustment can be made to the free-running counter 32 by slightly increasing or decreasing the rate at which the counter increments. Providing such appropriate adjustments locks the frequency of the counter 32 to the master clock 4.

Figure 11:
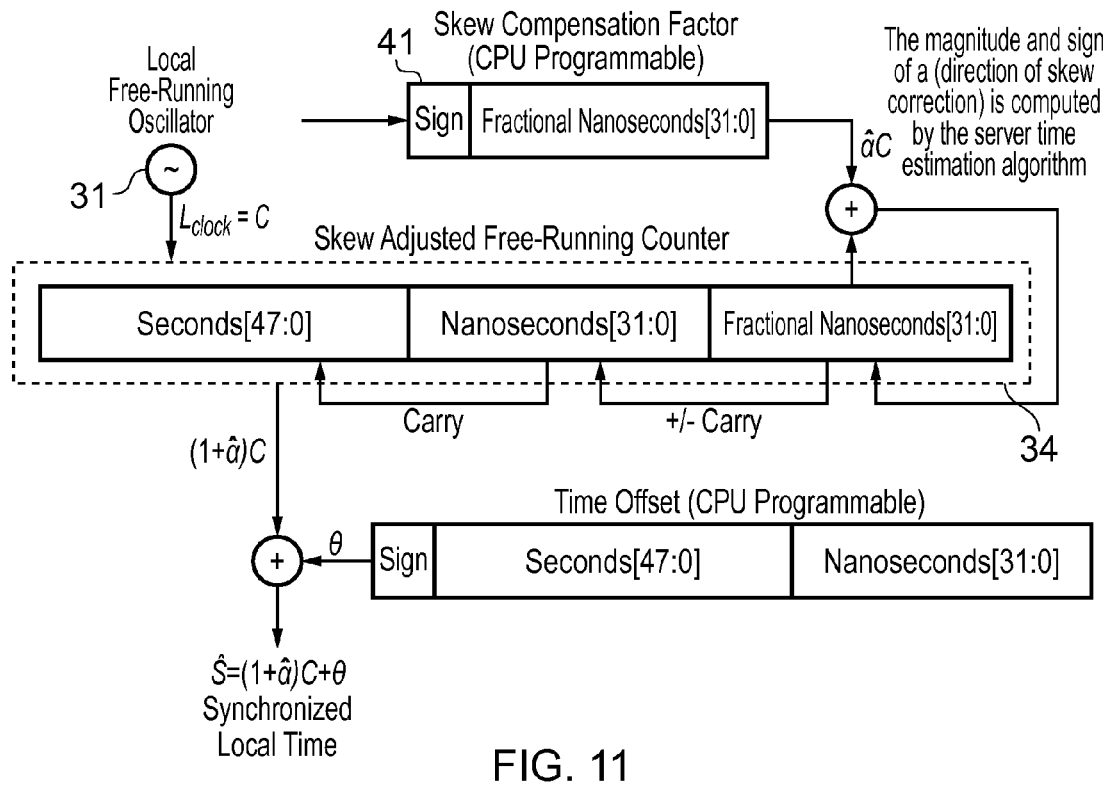
FIG. 11 shows an implementation of the steps of slave time offset and skew adjustment using a skew-adjusted free-running counter according to an embodiment of the present invention.

FIG. 11 shows an implementation of the skew-adjusted free-running counter 34 according to one embodiment of the present invention. As explained below, the architecture in FIG. 10 can be implemented either with two counters (i.e., a local free-running counter ((local assist hardware clock) plus a skew-adjusted counter) or with a single counter providing both functionalities (a skew-adjusted counter only).

Figure 12:
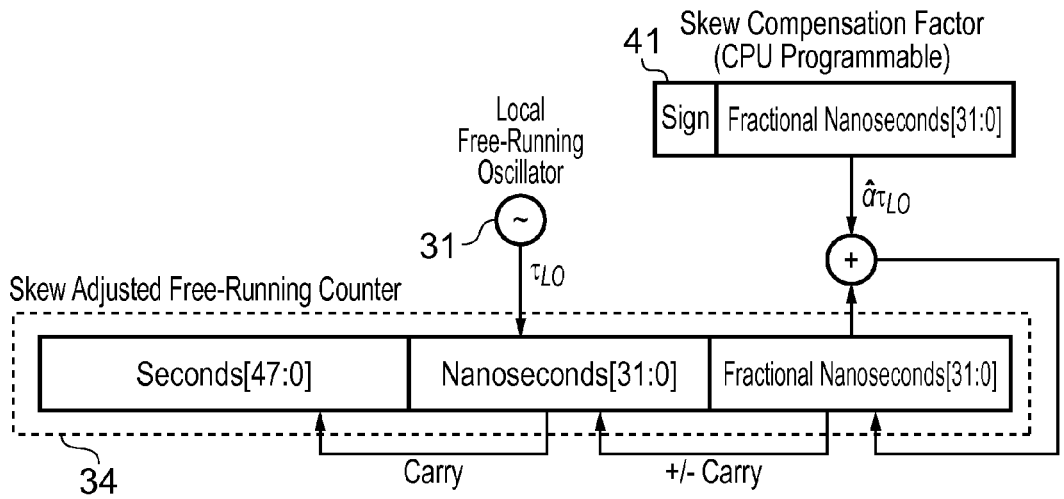
FIG. 12 shows the operation of the skew-adjusted free-running counter of FIG. 11.

It is assumed that the slave operates on a 125 MHz local reference clock, meaning the increment step is 8 ns each cycle or clock tick. The host processor 36 computes the skew and offset adjustment for the skew-adjusted free-running clock 34 based on the trend of slave clock and received PTP messages. The skew adjustment portion of the skew-adjusted free-running counter 34 can be implemented with a signed 32-bit fractional nanosecond counter portion (as shown by the fractional nanosecond portion in the counter 34 in FIG. 11 and FIG. 12), providing highly granular adjustments to the skew-adjusted free-running counter increment rate.

At each 125 MHz clock cycle, a programmable skew compensation factor 41 is added to or subtracted from the fractional nanosecond counter. If the fractional nanosecond counter rolls over or under, the skew-adjusted free-running counter 34 is incremented or decremented respectively. Since the skew-adjusted free-running counter 34 always increments by 8 ns at every 125 MHz cycle, the skew adjustment results in the skew-adjusted free-running counter effectively being incremented by 9 ns or 7 ns at a periodic interval determined by the skew computed by the host processor 36. This skew adjustment allows for very fine-grained control on the rate at which the free-running counter 34 increments, thereby enabling highly precise synchronization to the master clock 4.

Figure 13:
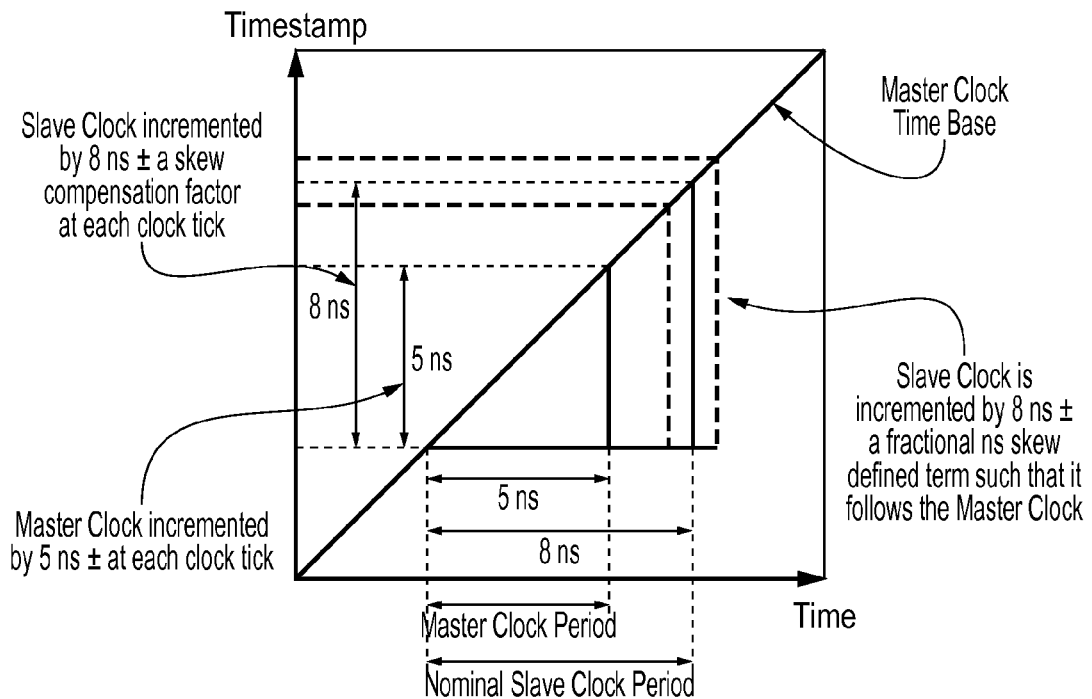
FIG. 13 illustrates the underlying synchronization between master and slave.

In the technique (FIG. 10, FIG. 11 and FIG. 12), at each local clock cycle, the skew-adjusted free-running counter 34 is incremented by the nominal period of the clock (e.g., 8 ns for a 125 MHz nominal output frequency). If the estimated skew is $\hat{\alpha}$=+10 ppm, for example, then the skew compensation factor written into the fractional nanosecond portion of the counter 34 (FIG. 12) every local clock period is $\hat{\alpha}\cdot\tau$=8 ns×10 ppm=+0.00008 ns. The skew-adjusted free-running counter 34 is adjusted in such a way that the counter evolution follows the computed server time estimate as illustrated in FIG. 13. As illustrated in FIG. 13, the adjustment of the increment (controlled by the computed skew) is carried out such that the increment falls along the master clock time base. With correct adjustment of the counter increments, the evolution of the counter provides both a time signal and frequency signal as explained below.

The architecture in FIG. 10 can be implemented with either two separate counters (the local free-running counter 31 (i.e., local assist hardware clock) and skew-adjusted free-running counter 34) or one counter (skew-adjusted free-running counter 34 only). Both architectures can be used to synthesize time and frequency signals:

Architecture with separate counters (local free-running counter 31 and skew-adjusted free-running counter 34):
The initialization of these counters are done as follows:
Local Free-Running Counter 31: This counter is used only for timestamping PTP messages. It can be initialized with first arriving Sync message at the slave. Its initial value can also be user configured.
Skew-Adjusted Free-Running Counter 34: This counter provides a continuous time signal for the slave locked to master. It is initialized with the first arriving Sync message and thereafter, it is tuned with the skew and offset computed by slave.

Architecture with one counter (skew-adjusted free-running counter 34 only): In this configuration, the skew-adjusted free-running counter 34 serves both as a timestamping counter as well as a counter that provides a continuous time signal for the slave. Initialization is carried out as follows:
The skew-adjusted free-running counter 34 is initialized with first arriving Sync message. This can also be a user configured initial value.
Skew-adjusted free-running counter readings now used to timestamp subsequent PTP messages.
First offset and skew are computed and skew-adjusted free-running counter adjusted to reflect these first clock parameter estimates. Skew-adjusted free-running counter readings used to timestamp subsequent PTP messages.
Subsequent periodic offset and skew estimates are computed and skew-adjusted free-running counter adjusted accordingly. Skew-adjusted free-running counter continues to provide slave reference signal locked to master. The counter continues to be used for timestamping PTP messages.
Once the clock skew has been computed and compensated for correctly, the slave clock offset should remain fairly constant at each update interval. Ideally, once the skew is properly compensated and an offset is computed and applied, the offset is only rarely changed. If the skew adjustment is properly tuned, the offset programmed into the counter offset adjustment block should be a constant value. The offset adjustment logic simply adds or subtracts a constant value from the skew-adjusted portion of the counter. The offset is applied to the skew compensated local time to synchronize the local time with the master's.

Figure 14:
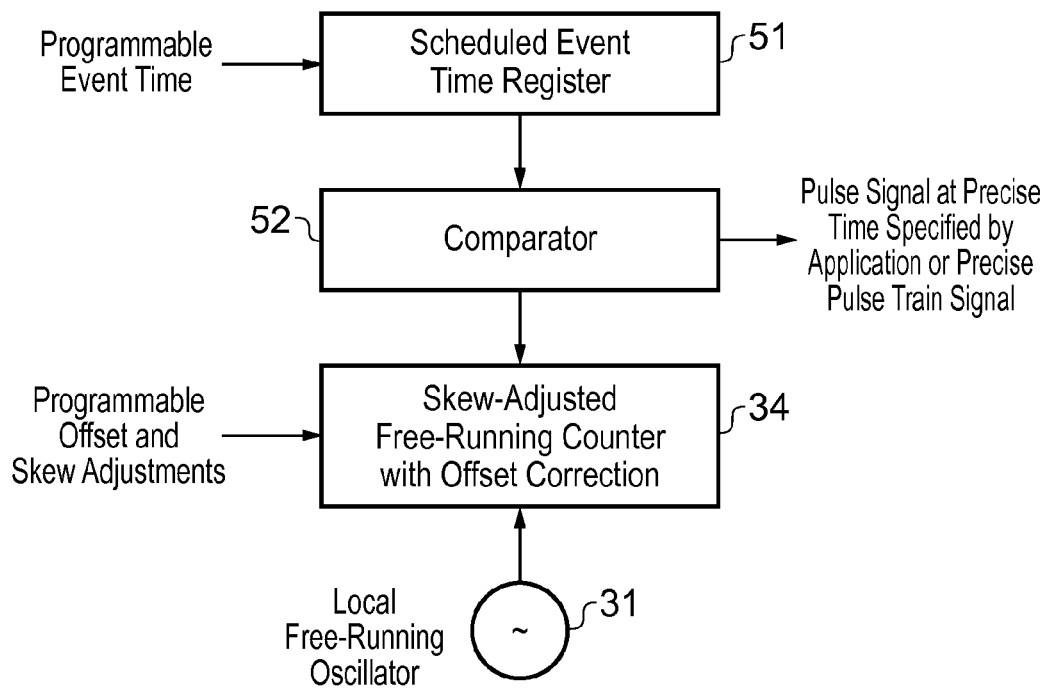
FIG. 14 shows the method of generating a pulse train using precise scheduled events timing according to an embodiment of the present invention.
Figure 15:
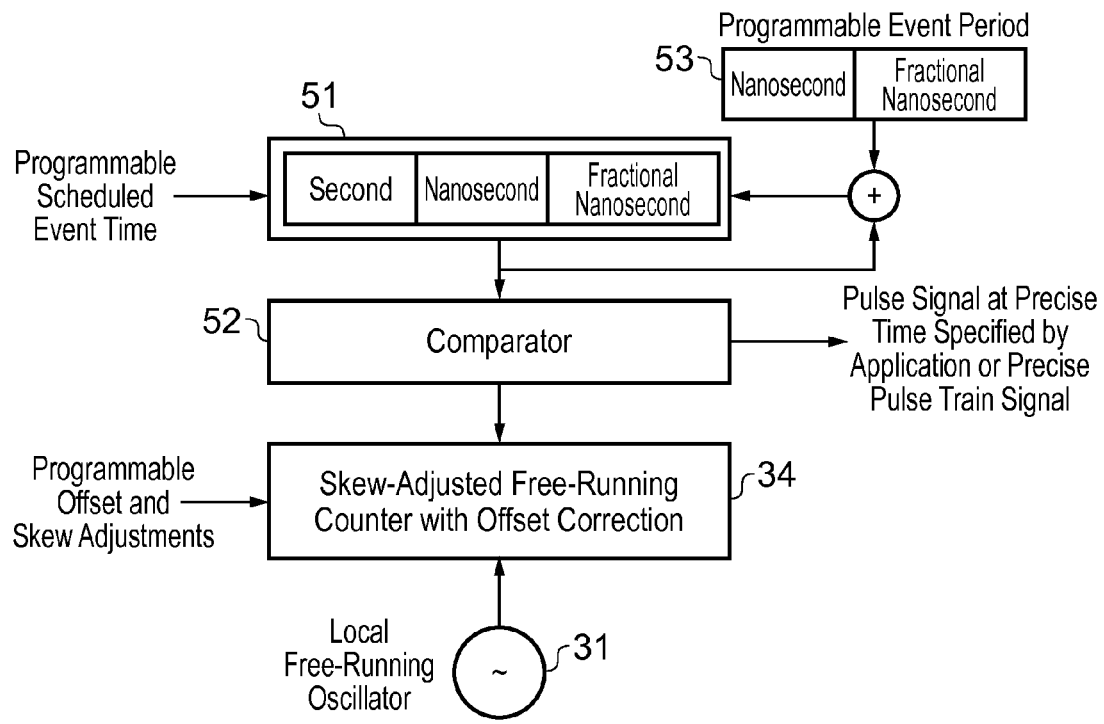
FIG. 15 shows the implementation of the method of FIG. 14.
Figure 16:
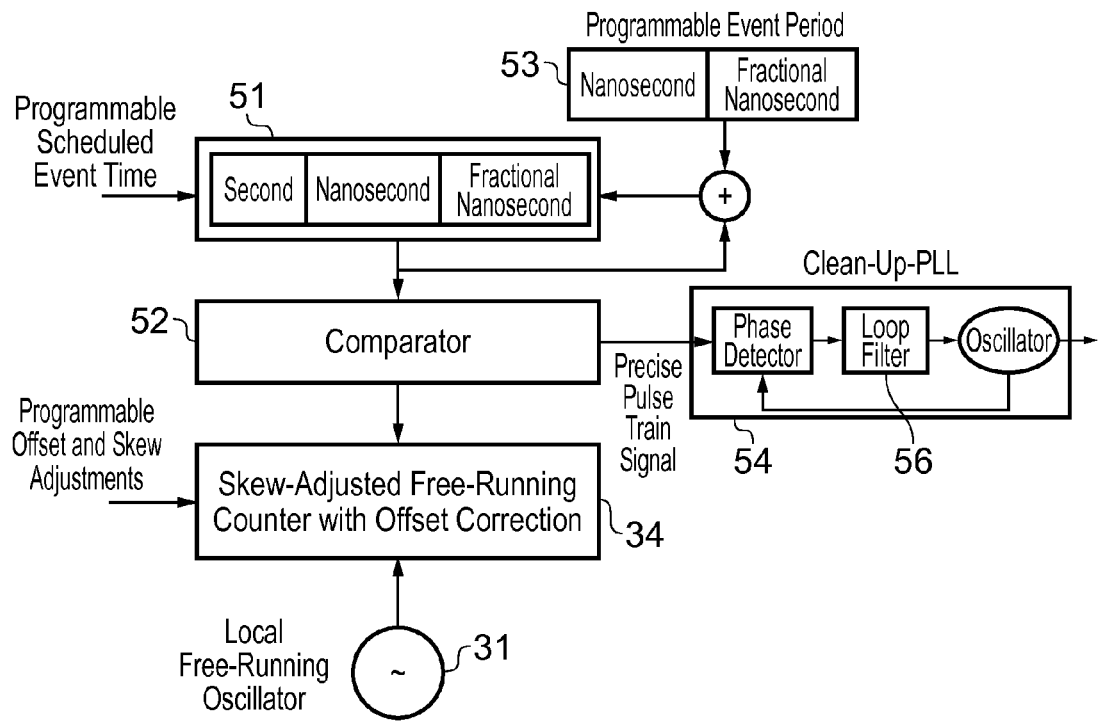
FIG. 16 shows the process of precise pulse train generation with a clean-up phase locked loop.

Both architectures allow a PTP slave clock 5 to use the skew and offset adjusted counter to generate a usable clock signal for end applications. With correct skew and offset estimates, each slave free-running counter is both frequency and time-of-day locked to the master clock. The master clock device 4 only communicates timing information to each of its slave clock devices to align its clock signal. The slave clock 5 uses the free-running clock and the timing information to generate a frequency and phase aligned clock signal traceable to the master clock as illustrated in FIG. 14, FIG. 15 and FIG. 16.

The skew-adjusted free-running counter 34 output can be used to schedule a pulse at a precise future time, for example, for event scheduling. It can also be used to generate a pulse train as illustrated in FIG. 14 and FIG. 15. For this, the scheduled event time is loaded into a coincidence register (scheduled event register 51) and when the skew-adjusted free-running counter 34 agrees with the register value as determined by the comparator 52, a pulse is issued. Particularly, the skew-adjusted free-running counter 34 output can be used to output a digitally synthesized clock signal at a programmable frequency for telecom systems. PDH/SDH reference frequencies are not integral factors of 125 MHz, thus requiring the counter clock signal to be synthesized using a host processor-programmable event period register 53 programmed with the correct period of the telecom clock signal. The event period register 53 indicates when to issue the clock pulse from a starting point determined by scheduled event register 51. The event period register 53 effectively controls the phase of the signal. Each register utilizes fractional nanoseconds to achieve frequency accuracy for non-integral factors of the 125 MHz system clock (free-running oscillator), as shown in FIG. 14 and FIG. 15.

A 2.048 MHz (E1) or 1.544 MHz (DS1) reference clock signal is generated by programming the event period register 53 with a value of 488.28125 ns or 647.66839 ns, respectively. The host processor 36 reads the current synchronized time value and subsequently sets the scheduled event register 51 to a point in time in the future where the first clock transition should occur. The clock output logic block issues the output clock signal at the exact time specified by the scheduled event register 51. The event period 53 is then added to the scheduled event register 51 in hardware to specify the next point in time when the clock output should be issued. This process repeats continuously in hardware as illustrated in FIG. 14 after initializing the event period register 53 and scheduled event register 51.

It is noted that because of the 8 ns quantization steps introduced by the 125 MHz system clock, the digitally synthesized clock signal will have an inherent jitter. If the inherent jitter does not satisfy the end application requirements, an external precision (clean-up) PLL 54 must be used to filter it out as illustrated in FIG. 16. The frequency signal can then be conditioned using a clean-up PLL 54 to provide a signal that meets the jitter requirements of the end applications. In addition, various forms of signals (square wave, sine wave, etc.) with interface form factors can be constructed from the raw unclean clock signal. The skew-adjusted free-running counter output (time signal) can also be formatted into various time standard signals.

As in PDH and SDH/SONET networks, two main timing related concerns in a node are jitter transfer (or jitter attenuation) and jitter generation (or intrinsic jitter). One of the key requirements (defined by ITU-T G.8262) is the jitter transfer system gain. Jitter transfer is defined as the ratio of input jitter to output jitter in dB. Jitter transfer refers to the magnitude of jitter at the output of a device for a given amount of jitter at the input of the device. Input jitter is applied at various amplitudes and frequencies, and output jitter is measured with various filters depending on the applicable standards. For the Clean-up PLL 54 (FIG. 16), the internal low pass loop filter 56 determines the jitter attenuation.

Jitter generation is the jitter created internally by the node itself. Since intrinsic jitter is always present. The majority of this jitter is generated by the PLL 54, power supplies and other components in the individual node. The designer must ensure that each node limits the amount of jitter it generates internally otherwise the jitter from each node will add to the noise in the network and eventually the output clock from the node will not meet the requirements of the intended application.

The Clean-up PLL 54 is designed to have a narrow loop bandwidth and ultra low output jitter (typically less than 0.2 ps). This allows the Clean-up PLL 54 to address the two critical issues of jitter transfer (narrow bandwidth, 6 Hz typical to filter out jitter from the clock recovered from the network), and jitter generation (less than 0.2 ps to limit the jitter injected into the network from the node). These high-performance attributes (low jitter transfer and low jitter generation) of a well-designed Clean-up PLL 54 allows a network to support a large number of cascaded nodes without exceeding the requirements of even the most stringent timing applications. The Clean-up PLL 54 should therefore be selected to meet the exact application requirements.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. S. B. Moon, P. Skelly and D. Towsley, "Estimation and removal of clock skew from network delay measurements," in *Proc. IEEE INFOCOM*, vol. 1, pp. 227-234, New York, N.Y., USA, March 1999.

[2]. P. Skelly, S. B. Moon, D. Towsley, Verizon Laboratories Inc. (2003), Clock skew estimation and removal, U.S. Pat. No. 6,661,810.

[3]. L. Zhang, Z. Liu and C. H. Xia, "Clock synchronization algorithms for network measurements," in *Proc. IEEE INFOCOM*, vol. 1, pp. 160-169, November 2002.

[4]. Z. Liu, C. H. Xia, L. Zhang, International Business Machines Corporation (2005), Clock synchronization with removal of clock skews through network measurements in derivation of a convex hull, U.S. Pat. No. 6,957,357.

[5]. S. M. Carlson, M. H. T. Hack and L. Zhang, International Business Machines Corporation (2010), Method and system for clock skew and offset estimation, U.S. Pat. No. 7,688,865.

All references referred to above are hereby incorporated by reference.

The invention claimed is:

1. A slave device connected to a master device having a master clock over a network, wherein the slave device includes a slave clock, and wherein:

the slave device is arranged to:
exchange with the master device, timing messages and record timestamps which are: the time of sending of said timing messages from the master device according to the master clock; the time of receipt of said timing messages according to the slave clock; the time of sending of said timing messages according to the slave clock; and the time of receipt of said timing messages according to the master clock;
formulate a linear programming problem which seeks to minimize the expression $\theta_f - \theta_r$ in which $\theta_f$ is the offset of the slave clock compared to the master clock, derived from timing messages sent from the master to the slave and $\theta_r$ is the offset derived from timing messages sent from the slave to the master, subject to the constraints that $T_{1,n} \geq (1+\alpha)T_{2,n} + \theta_f$, $T_{4,n} \leq (1+\alpha)T_{3,n} + \theta_r$, and $\theta_f - \theta_r \geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock;
solve the linear programming problem to derive an estimate of the skew and offset of the slave clock relative to the master clock; and
synchronize the slave clock to the master clock based on the estimated skew and offset to produce a master time estimate.

2. A slave device according to claim 1 wherein the slave clock includes a local free-running oscillator and a skew-adjusted free-running counter driven by the output of said local free-running oscillator, and the slave device is arranged to synchronize the frequency of the slave clock to the frequency of the master clock by adjusting the skew-adjusted free-running counter to take account of the estimated skew and applying the estimated offset to the output of the skew-adjusted free-running counter to produce the master time estimate.

3. A slave device according to claim 2 wherein the slave device has a memory area storing a signed skew compensation factor derived from said estimate of the skew which is added to the skew-adjusted free-running counter at each clock cycle of the local free-running oscillator.

4. A slave device according to claim 3 wherein the skew compensation factor is an adjustment factor representing a fractional nanosecond adjustment to be applied to the skew-adjusted free-running counter.

5. A slave device according to claim 2 wherein the skew-adjusted free-running counter is also used to provide timestamps for the time of receipt and of sending of timing messages at/from the slave device.

6. A slave device according to claim 5 wherein the counter is initialized on receipt by the slave device of the first timing message from the master device, and the counter is reset on receipt of the first master time estimate to said first master time estimate.

7. A slave device according to claim 2 further comprising a second free-running counter driven by the output of the local free-running oscillator, wherein the second counter is used to provide timestamps for the time of receipt and sending of timing messages at/from the slave device.

8. A slave device according to claim 2 wherein the slave device further includes a first programmable register storing scheduled event times and a comparator, wherein the comparator is arranged to compare the master time estimate to the event times stored in said register and produce an output signal when there is a match.

9. A slave device according to claim 8 wherein the slave device includes a second programmable register storing an event period and is arranged to produce a pulsed output signal by incrementing a scheduled event time stored in said first programmable register by the event period stored in said second programmable register each time a match is found by the comparator.

10. A slave device according to claim 9 wherein the pulsed output of the comparator is conditioned using a phase locked loop to reduce the jitter in the output.

11. A method of synchronizing the time and frequency of a slave clock in a slave device to a master clock in a master device which is connected to the slave device over a network, the method including the steps of:

exchanging, between the master device and the slave device, timing messages and timestamps which are: the time of sending of timing messages from the master device according to the master clock; the time of receipt of said timing messages according to the slave clock; the time of sending of said timing messages according to the slave clock; and the time of receipt of said timing messages according to the master clock;
formulating a linear programming problem which seeks to minimize the expression $\theta_f - \theta_r$ in which $\theta_f$ is the offset of the slave clock compared to the master clock, derived from timing messages sent from the master to the slave and $\theta_r$ is the offset derived from timing messages sent from the slave to the master, subject to the constraints that $T_{1,n} \geq (1+\alpha)T_{2,n} + \theta_f$, $T_{4,n} \leq (1+\alpha)T_{3,n} + \theta_r$, and $\theta_f - \theta_r \geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock;
solving the linear programming problem to derive an estimate of the skew and offset of the slave clock relative to the master clock; and
synchronizing the slave clock to the master clock based on the estimated skew and offset to produce a master time estimate.

12. A method according to claim 11 wherein the slave clock includes a local free-running oscillator and a skew-adjusted free-running counter driven by the output of said local free-running oscillator, and the step of synchronizing includes the steps of:

synchronizing the frequency of the slave clock to the frequency of the master clock by adjusting the skew-adjusted free-running counter to take account of the estimated skew and applying the estimated offset to the output of the skew-adjusted free-running counter to produce the master time estimate.

13. A method according to claim 12 further including the steps of:

storing a signed skew compensation factor derived from said estimate of the skew in a memory area; and adding said compensation factor to the skew-adjusted free-running counter at each clock cycle of the local free-running oscillator.

14. A method according to claim 13 wherein the skew compensation factor is an adjustment factor representing a fractional nanosecond adjustment to be applied to the skew-adjusted free-running counter.

15. A method according to claim 12 wherein the skew-adjusted free-running counter is also used to provide timestamps for the time of receipt and of sending of timing messages at/from the slave device.

16. A method according to claim 15 further including the steps of:

initializing the counter on receipt by the slave device of the first timing message from the master device, and resetting the counter to said first master time estimate on receipt of the first master time estimate.

17. A method according to claim 12 wherein the slave device further comprises a second free-running counter driven by the output of the local free-running oscillator, and the second counter is used to provide timestamps for the time of receipt and sending of timing messages at/from the slave device.

18. A method according to claim 12 wherein the slave device further includes a first programmable register storing scheduled event times and the method further includes the steps of:

comparing the master time estimate to the event times stored in said register; and producing an output signal when there is a match.

19. A method according to claim 18 wherein the slave device includes a second programmable register storing an event period and the method further includes the step of incrementing a scheduled event time stored in said first programmable register by the event period stored in said second programmable register each time a match is found by the comparator to produce a pulsed output signal.

20. A method according to claim 19 further including the step of conditioning the pulsed output of the comparator using a phase locked loop to reduce the jitter in the output.

21. A time and frequency synchronisation system for a network, the system including:

a master device having a master clock;

a slave device having a slave clock; and a network connecting the master and slave devices, wherein:

the slave clock comprises a slave clock; and the slave device is arranged to:

exchange with the master device, timing messages and to record timestamps which are: the time of sending of said timing messages from the master device according to the master clock; the time of receipt of said timing messages according to the slave clock; the time of sending of said timing messages according to the slave clock; and the time of receipt of said timing messages according to the master clock;

formulate a linear programming problem which seeks to minimize the expression $\theta_f - \theta_r$, in which $\theta_f$ is the offset of the slave clock compared to the master clock, derived from timing messages sent from the master to the slave and $\theta_r$ is the offset derived from timing messages sent from the slave to the master, subject to the constraints that $T_{1,n} \geq (1+\alpha)T_{2,n} + \theta_f$, $T_{4,n} \leq (1+\alpha)T_{3,n} + \theta_r$, and $\theta_f - \theta_r \geq 0$ wherein: $\alpha$ is the skew of the slave clock compared to master clock; $T_{1,n}$ is the time of sending of the nth timing message from the master device according to the master clock; $T_{2,n}$ is the time of receipt of the nth timing message from the master device according to the slave clock; $T_{3,n}$ is the time of sending of the nth timing message from the slave device according to the slave clock; and $T_{4,n}$ is the time of receipt of the nth timing message from the slave device according to the master clock;

solve the linear programming problem to derive an estimate of the skew and offset of the slave clock relative to the master clock; and synchronize the slave clock to the master clock based on the estimated skew and offset to produce a master time estimate.

22. A system according to claim 21 wherein the slave clock includes a local free-running oscillator and a skew-adjusted free-running counter driven by the output of said local free-running oscillator, and the slave device is arranged to synchronize the frequency of the slave clock to the frequency of the master clock by adjusting the skew-adjusted free-running counter to take account of the estimated skew and applying the estimated offset to the output of the skew-adjusted free-running counter to produce the master time estimate.

23. A system according to claim 22 wherein the slave device has a memory area storing a signed skew compensation factor derived from said estimate of the skew which is added to the skew-adjusted free-running counter at each clock cycle of the local free-running oscillator.

24. A system according to claim 23 wherein the skew compensation factor is an adjustment factor representing a fractional nanosecond adjustment to be applied to the skew-adjusted free-running counter.

25. A system according to claim 22 wherein the skew-adjusted free-running counter is also used to provide timestamps for the time of receipt and of sending of timing messages at/from the slave device.

26. A system according to claim 25 wherein the counter is initialized on receipt by the slave device of the first timing message from the master device, and the counter is reset on receipt of the first master time estimate to said first master time estimate.

27. A system according to claim 22 further comprising a second free-running counter driven by the output of the local free-running oscillator, wherein the second counter is used to provide timestamps for the time of receipt and sending of timing messages at/from the slave device.

28. A system according to claim 22 wherein the slave device further includes a first programmable register storing scheduled event times and a comparator, wherein the comparator is arranged to compare the master time estimate to the event times stored in said register and produce an output signal when there is a match.

29. A system according to claim 28 wherein the slave device includes a second programmable register storing an event period and is arranged to produce a pulsed output signal by incrementing a scheduled event time stored in said first programmable register by the event period stored in said second programmable register each time a match is found by the comparator.

30. A system according to claim 29 wherein the pulsed output of the comparator is conditioned using a phase locked loop to reduce the jitter in the output.

* * * * *